Dec. 15, 1942.     J. B. MANGAN     2,305,221
PREDETERMINING APPARATUS FOR LIQUID DISPENSING PUMPS
Filed Feb. 19, 1940     7 Sheets-Sheet 1

Inventor
JOSEPH B. MANGAN
By Lindsey and Robillard
Attorneys

Dec. 15, 1942. J. B. MANGAN 2,305,221
PREDETERMINING APPARATUS FOR LIQUID DISPENSING PUMPS
Filed Feb. 19, 1940 7 Sheets-Sheet 3

Fig. 4

Inventor
JOSEPH B. MANGAN
By Lindsey and Robillard
Attorneys

Fig-13

Patented Dec. 15, 1942

2,305,221

UNITED STATES PATENT OFFICE 2,305,221

PREDETERMINING APPARATUS FOR LIQUID DISPENSING PUMPS

Joseph B. Mangan, Wethersfield, Conn., assignor to Veeder-Root Incorporated, Hartford, Conn., a corporation of Connecticut Application February 19, 1940, Serial No. 319,577

13 Claims. (Cl. 221—101)

This invention relates to a predetermining mechanism for use in liquid dispensing pumps of the type having a meter and a computer driven thereby, the computer being provided with means for indicating the amount of liquid dispensed during each transaction, means for registering the total cost or value of the liquid so dispensed, and a speed variating mechanism through which the indicating means are driven. A computer of this type is illustrated and described in the United States patent to Edward A. Slye, No. 2,111,996 dated March 20, 1938.

In accordance with the present invention, there is provided a predetermining apparatus having a preset counter adapted to be set to indicate, either in terms of volume or in value, the amount of liquid to be dispensed on any transaction; predetermining mechanism constructed and arranged to automatically reduce the flow of liquid being dispensed to a dribble just before the predetermined amount of liquid has been dispensed, and then completely stop the flow of liquid when the total amount has been dispensed; means for connecting the preset counter and predetermining mechanism to the amount indicating portion or the value indicating portion of the computer; means for simultaneously presetting the preset counter and the predetermining mechanism in accordance with the predetermined amount or value of liquid to be dispensed, and reset means for restoring, simultaneously with the resetting operation of the computer, the predetermining apparatus to a condition where it may be preset for the next transaction.

The object of the invention is to provide an improved apparatus of this sort which may be easily and quickly set to perform its various functions, which is simple in construction, and economical in manufacture, and which is accurate, dependable, and reliable in service and performance.

Other objects will be in part obvious and in part pointed out more in detail hereinafter.

The invention accordingly consists in the features of construction, combination of elements and arrangement of parts which will be exemplified in the construction hereafter set forth and the scope of the application of which will be indicated in the appended claims.

Figure 13:
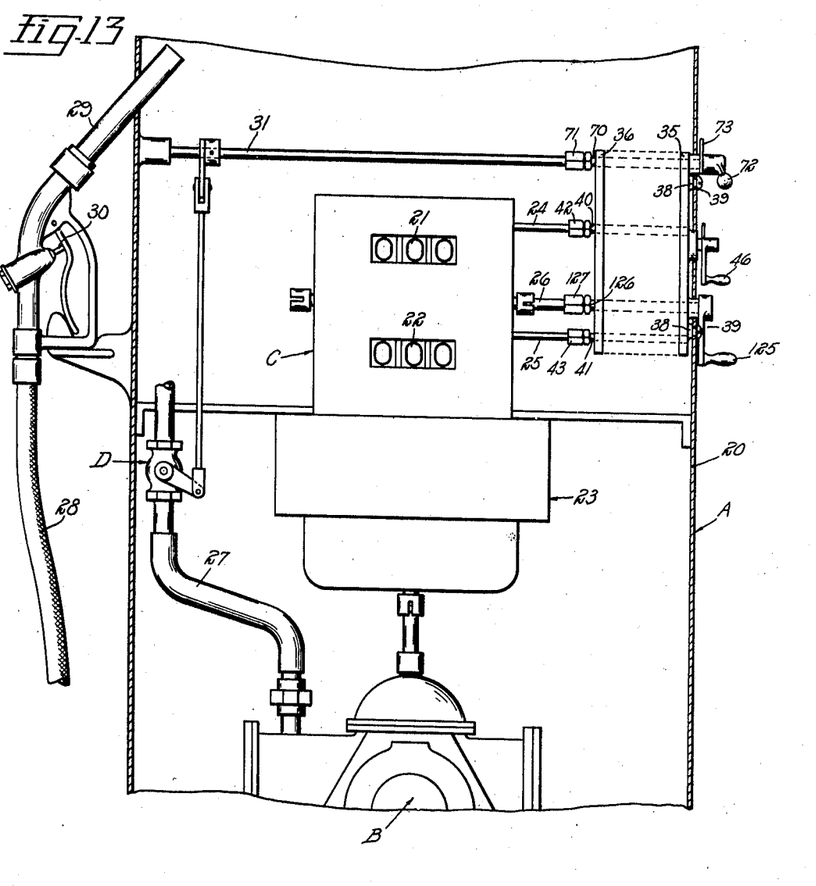
Fig. 13 is a diagrammatic view of a liquid dispensing pump in which the apparatus of the preset invention is incorporated.

Referring to the drawings, there is shown in Fig. 13 such portions of a liquid dispensing pump as may be necessary to illustrate one use of the present invention. This figure is more or less diagrammatic. A designates a pump casing having a side wall 20. Within the casing is a meter B which drives the computer C. The computer C has a counter or indicator 21 for indicating the value or cost of the liquid dispensed, a counter or indicator 22 for indicating the amount of volume of the liquid dispensed, and a variator or a speed change mechanism 23 through which indicating mechanisms are driven by the meter. As computers of this type are in general use, the same is not shown in detail in the drawings. For present purposes, it is sufficient to say that the computer has a shaft 24 associated with the value indicating means and rotated at a fixed ratio with respect thereto, a similar shaft 25 driven at a fixed ratio with respect to the quantity indicator, and a reset shaft 26 through which the quantity and cost indicating means may be reset to zero after each transaction. Leading from the meter is an outlet passage 27 which delivers to the flexible hose 28 provided at its end with the usual delivery nozzle 29 which has a manually operable valve 30 for controlling the flow of fluid. Within the passage 27 is a main control valve D which is operatively connected to a controlling shaft 31. The improved predetermining apparatus forming the subject matter of the present invention is positioned, as shown in Fig. 13, between one side of the computer and the wall 20 of the pump housing.

Figure 1:
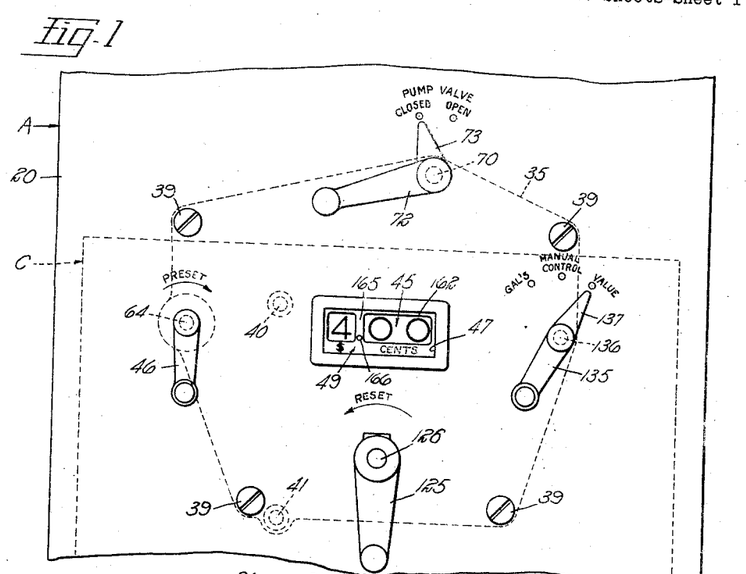
Figure 1 is a front view of the apparatus.
Figure 2:
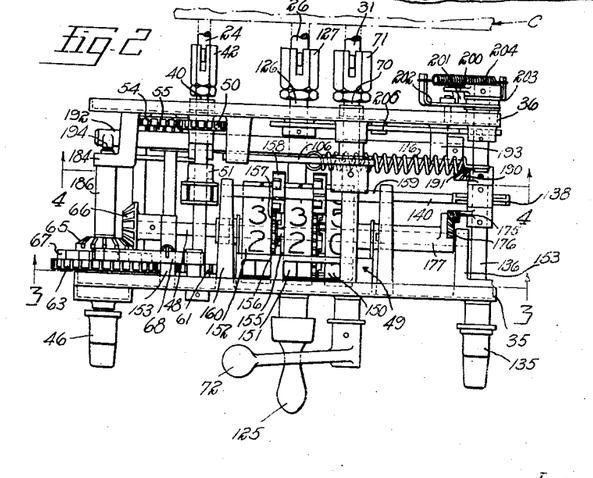
Fig. 2 is a top plan view thereof, a portion of the computer being illustrated by broken lines.
Figure 5:
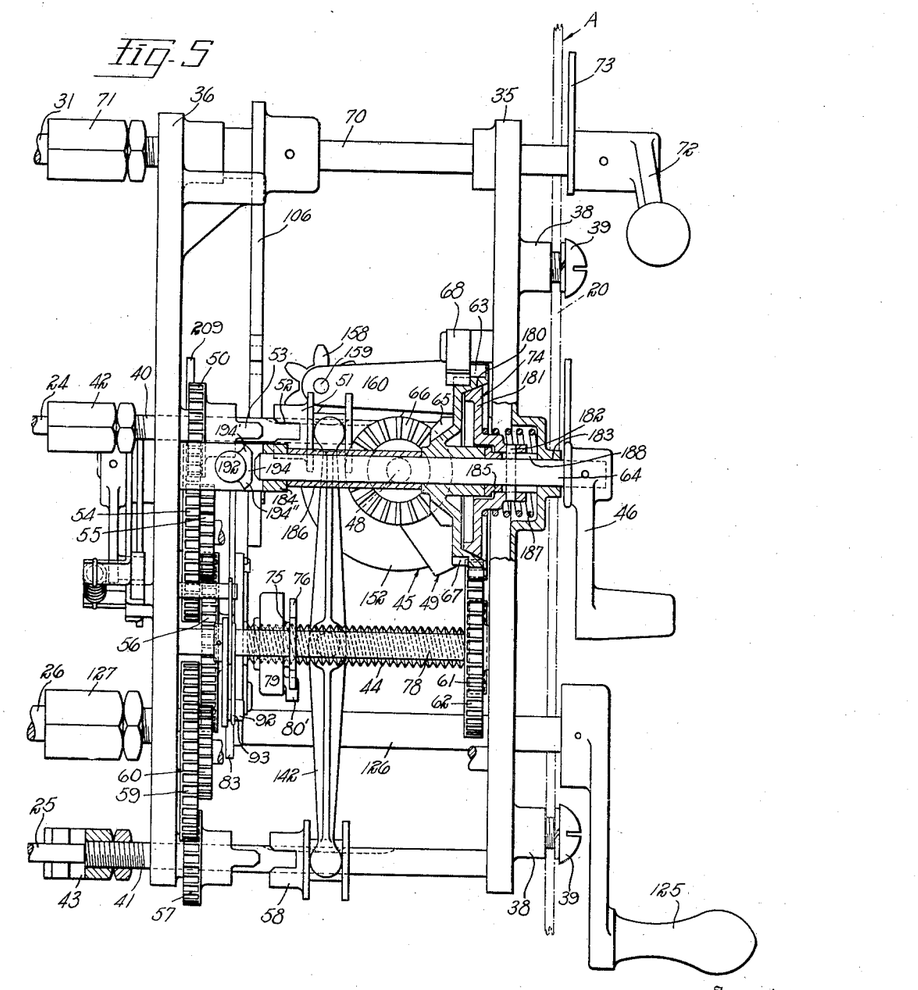
Fig. 5 is a side elevational view of the apparatus with parts being broken away, this view being taken looking towards the left hand side of Figs. 1 and 2, the parts being shown in the positions which they normally have after the apparatus has been reset.

The predetermining apparatus has a supporting structure which may be of any suitable sort and which is here shown as comprising a front plate or frame member 35 and a rear plate or frame member 36. These frame members are secured in spaced relation by the tie rods 37. The front plate is provided with bosses 37 (see Fig. 5) which receives screws 39 by means of which the apparatus is secured to the wall 20. As shown in Figs. 2 and 5, the apparatus has two drive shafts 40 and 41, respectively, aligned with and connected by couplings 42 and 43 to, the shafts 24 and 25 of the computer so that the shaft 40 is driven in fixed ratio with the cost indicating means of the computer, and the shaft 41 is driven in fixed ratio with the quantity indicating means of the computer. These drive shafts 40 and 41 are adapted to be selectively connected to the predetermining mechanism which is arranged to automatically control the pump valve D. This predetermining mechanism includes a feed screw 44. The apparatus of the present invention is also provided with a preset counter (indicated generally by the numeral 45) for indicating the setting of the predetermining mechanism and also for indicating, during any dispensing transaction, the amount or value (as the case may be) of the liquid still to be dispensed during a particular transaction. The counter has an adjustable sign shutter 49 for denoting whether the apparatus is connected to the cost indicating portion of the computer or the amount indicating portion of the computer, or whether the apparatus is disconnected from both of said portions. The preset counter shaft 48 is geared to the feed screw 44 of the predetermining mechanism so as to be driven in unison therewith. The predetermining mechanism and the associated counter are simultaneously preset in accordance with the desired amount or desired value of liquid to be dispensed on any transaction by rotating a preset handle 46 until the correct numerals on the numeral wheels appear in the window 47 (see Fig. 1).

The drives between the drive shafts 40 and 41, on the one hand, and the screw 44 of the predetermining mechanism and the shaft 48 of the preset counter 45 on the other hand, will now be described. Loose on the shaft 40 is a gear 50 (see Fig. 5) and splined to this shaft is a slidable clutch sleeve 51, the latter having notches 52 adapted to receive clutch teeth 53 carried by the hub of the gear 50. The gear 50 meshes with a large idler 54 which carries a smaller gear 55 meshing with a gear 56 secured to the feed screw 44 adjacent its rear end. The quantity drive shaft 41 carries a loose gear 57 and a splined clutch sleeve 58 which are similar in construction and operation to the gear 50 and sleeve 51. The gear 57 meshes with a large gear 59 which carries a small gear 60 meshing with said gear 56. The shaft 48 of the preset counter 45 is driven in fixed relation to the feed screw 44 through the following connections. Fixed to the feed screw, adjacent its forward end, is a gear 61 meshing with an idler 62 which, in turn, meshes with a gear 63 which is normally loose on a preset shaft 64, the forward end of which carries the preset handle 46. Formed integrally with the gear 63 is a bevel gear 65 meshing with a like gear 66 fixed to the counter shaft 48. Between the gear 63 and the preset shaft 64 is a cone clutch designated generally by the numeral 74. It may be stated here that the feed screw and the preset counter are preset in accordance with the value or amount of liquid to be dispensed, as the case may be, by turning the preset handle 46 in a clockwise direction (Fig. 1) until the correct numerals appear in the window 47, and during such presetting operation, the clutches associated with the drive shafts 40 and 41 are both de-clutched and the cone clutch 74 is engaged. Upon rotation of the handle 46, the presetting operation of the feed screw is effected through the cone clutch 74 and gears 63, 62, and 61, and the preset counter is rotated in an additive direction through the gears 65 and 66. When the predetermining mechanism is being driven from the counter through a dispensing operation, the cone clutch is disengaged to make it impossible to offset the count indicated on the preset counter by turning the preset handle 46. To accurately locate the figures of the counter in the window and to make the setting easier and quicker, a notched disc 67 and a detent 68 are provided. The disc is integral with the gear 63 and the detent is held in contact with the disc by a spring 69.

Figure 3:
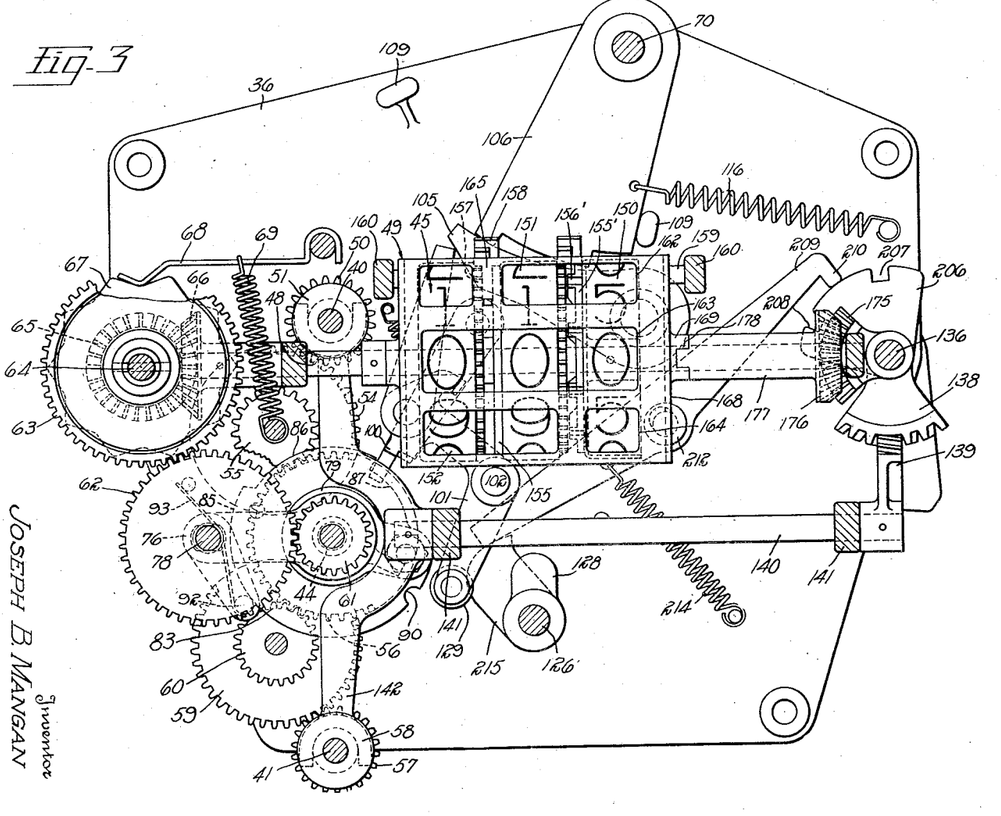
Fig. 3 is a transverse sectional view through the apparatus, the same being taken substantially on the line 3—3 of Fig. 2.

The clutches respectively associated with the cost drive shaft 40 and the quantity drive shaft 41 are manually controlled through the selector handle or crank 135 fixed to the forward end of a selector shaft 136. As shown in Fig. 1, the handle 135 has a pointer 137 cooperating with indicia on the exposed face of the pump casing wall 20 so as to show the three selective positions of the handle. This indicia is respectively "gallons," "manual control" and "value." Fixed to the shaft 136, as shown in Figs. 2 and 3, is a worm gear segment 138 meshing with a cooperating worm segment 139 fixed to a transverse shaft 140 journaled in brackets 141 extending rearwardly from the front frame member 35. Fixed to the shaft 140 is a shipper lever 142, the opposite ends of which are of yoke form so that the arms thereof engage in the grooves provided in the clutch sleeves 51 and 58. When the selector handle 135 is in its mid or "manual control" position, both of the clutches are disengaged, as shown in Fig. 5. At this time, the predetermining apparatus is entirely declutched from the computer, and the flow of fluid during a dispensing operation is manually and independently controlled by the operator through the valve 30 carried by the nozzle 29. When the selector handle 135 is moved to the "value" position shown in Fig. 1, the clutch sleeve 51 is engaged with the hub of the gear 50 so that, during a dispensing operation, the feed screw 44 is driven through the gears 50, 54, 55, and 56, and the preset counter 45 is rotated in a subtracting direction from the feed screw through the gears 61, 62, 63, 65, and 66. During such time, of course, the cost indicating portion or counter 21 of the computer indicates, in an additive manner, the cost of the liquid as it is being dispensed. When the preselector handle 135 is moved to its other extreme position, namely, the "gallons" position, the clutch sleeve 58 associated with the drive shaft 41 is clutched to the hub of the gear 57 so that the feed screw is driven through the gears 57, 59, 60, and 56, and the preset counter is driven from the feed screw in the same manner as previously described. During such time, of course, the amount indicating portion or counter 22 of the computer indicates, in an additive manner, the amount of liquid being dispensed.

The predetermining mechanism is arranged to permit the control valve D of the gasoline dispensing pump to partially close to reduce the flow of fluid to a dribble just before the predetermined amount or value of liquid has been dispensed, and then completely close when the full preselected amount of liquid has been dispensed. The predetermining mechanism controls the valve D through a shaft 70 journalled in the frame plates 35 and 36 and aligned with the usual control shaft 31 of the dispensing pump. The shafts 31 and 70 are connected by a coupling 71. The forward end of the shaft 70, which extends through the side wall 20 of the pump casing has a manual control handle 72. This handle has a pointer 73 which cooperates with indicia on the exposed face of the side wall 20 of the pump casing (see Figure 1) so as to indicate when the valve is in its respective closed and opened positions.

As stated, the predetermining mechanism includes the feed screw 44 adapted to be selectively driven from the quantity indicating portion or the cost indicating portion of the computer. Threaded on the screw 44 is a traveling nut 75 which is differentially adjustable lengthwise of the screw in accordance with the predetermined amount or value of the liquid to be dispensed. During the presetting operation, the screw is turned in one direction by means of the preset handle 46 until the nut 75 has been adjusted on the screw toward the right (Fig. 5) to a position corresponding to the value or amount of liquid to be dispensed, as indicated by the preset counter. During the dispensing operation, the screw is rotated in the opposite direction from the drive shaft 40 or the drive shaft 41, as the case may be, so that the nut will travel towards the left and, as it approaches its extreme left hand position, it cooperates with a tripping cam 83 with the result that the valve D is permitted to partially close just before the total amount or value of liquid has been dispensed, and then completely close.

Figure 9:
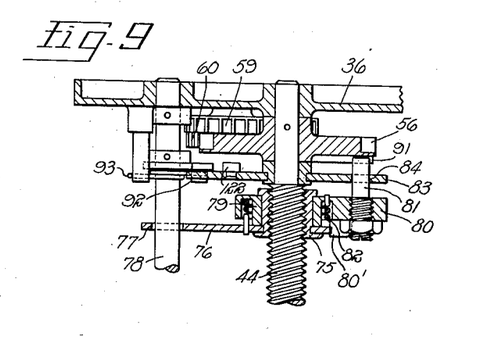
Fig. 9 is a detail view of portions of the predetermining mechanism.

The traveling nut, during its travel on the screw, is held against rotation by an arm 76 having an opening 77 through which a fixed rod 78 extends. Movable with, but having limited rotary movement with respect to, the nut 75 is a collar 79 provided with a radially extending arm 80 which carries a stud 81 (see Fig. 9). Within the recess of the collar is a torque spring 82, one end of which is connected to the collar and the other end of which is connected to the arm 76. The spring normally tends to turn the arm 80 clockwise with reference to Fig. 4. The extent of such clockwise movement of the arm 80 is limited by the engagement of a lug 80' on the arm against the lower edge of the arm 76. Rotatably mounted on the unthreaded rear end of the feed screw and adjacent the gear 56 (see Fig. 6) is a tripping disc or cam 83 having an opening 84 adapted to receive the stud 81. This cam (see Fig. 4) has three successive concentric cam surfaces 85, 86, and 87 of different radii. Between the cam surface 85 of largest radius and the cam surface 86 of intermediate radius is a stop or shoulder 88, and between the cam surface 86 and the cam surface 87 of smallest radius is a like stop or shoulder 89. The periphery of the cam 83 has a notch 90. The gear 56 is provided with a driving lug 91 with which the rear end of the stud 81 is adapted to cooperate. It may be said here that at the start of the preset operation, the cam 83 will turn from the position shown in Fig. 4 to that shown in Fig. 6, and it will be held in that position by the engagement of a detent 92 in the notch 90. The detent is resiliently urged into holding position by a spring 93. The predetermining apparatus, having been preset in accordance with the value or amount of liquid to be dispensed in a particular transaction, and the dispensing operation having been proceeded with, the cam 83 just before completion of the dispensing operation will be turned counterclockwise from the position shown in Fig. 6 to that shown in Fig. 4, and during such movement of the cam, releasing means associated therewith will be operated to permit the control valve D of the dispensing pump to be partially closed, and then after a short interval to be fully closed.

This releasing means includes a follower or trigger 100 adapted to engage the periphery of the cam 83. The trigger is a part of a supporting lever or bell crank 101 pivoted on a rod 102. Pivoted to the lever 101, as at 103, is a connector 104 which cooperates with a pawl 105 which, in turn, cooperates with a stop plate 106 carried by the valve control shaft 70. The stop plate 106 is in the form of a sector with its periphery stepped so as to provide two radial shoulders or stop faces 107 and 108. Swinging movement of the stop plate is limited by lugs 109 carried by the rear frame member 36. The pawl 105 is pivoted on a stud 110 projecting from the rear frame member 36. The pawl, adjacent its free end, has an inclined face 112 which terminates in a holding face 113. The arm 104 is normally urged into the pawl holding position shown by broken lines in Fig. 4, and by full lines in Figs. 6 and 7, by a spring 114, the opposite ends of which are respectively connected to the arm 104 and a supporting lever 101. The supporting lever 101 carries an ear 115 against which the right hand edge of the arm 104 engages when the arm is in pawl holding position. When the supporting lever 101 rocks counterclockwise from the position shown in Fig. 6 to the position shown in Fig. 8, the ear 115 moves the arm 104 to the position shown in Fig. 8. A spring 116 normally urges the stop plate 106 into the full line position shown in Figs. 4 and 8 and in which position the control valve is closed. The handle 72 connected to the shaft 70 is then in the position shown in Fig. 1. Associated with the trigger or follower is a latch 117 which serves the purpose of holding the trigger away from the cam 83 while the cam is being rotated clockwise during initial presetting of the predetermining mechanism. This latch is in the form of a plate pivoted on a pin 118 extending from the rear frame member. It is urged towards latching position by a spring 123. It has at its lower end a holding lug 119 which is adapted to engage beneath a shoulder 120 on the bell crank 101. The latch further has projecting from its lower end a knock-off extension 121 which lies in a plane rearwardly of the plane of the cam 83. This extension is adapted to be engaged by a knock-off pin 122 projecting from the rear face of the cam 83 as the cam approaches the position shown in Fig. 6.

As hereinafter described more in detail, the computer and the predetermining apparatus are reset by rotating a reset handle 125 counter-clockwise as shown by the arrow in Fig. 1. On initial rotation of this handle, the selector crank 135 and selector shaft 136, together with the parts associated therewith, are restored to such a condition that the flow of liquid from the pump is under manual control and the predetermining apparatus is declutched from the computer. The reset handle 125 is carried by a shaft 126 which is connected by a coupling 127 to the reset shaft 26 of the computer. This shaft 126 carries a cam lobe 128 adapted to cooperate with a roller 129 carried by the lower end of the supporting lever or bell crank 101.

Figures 6, 7, 8:
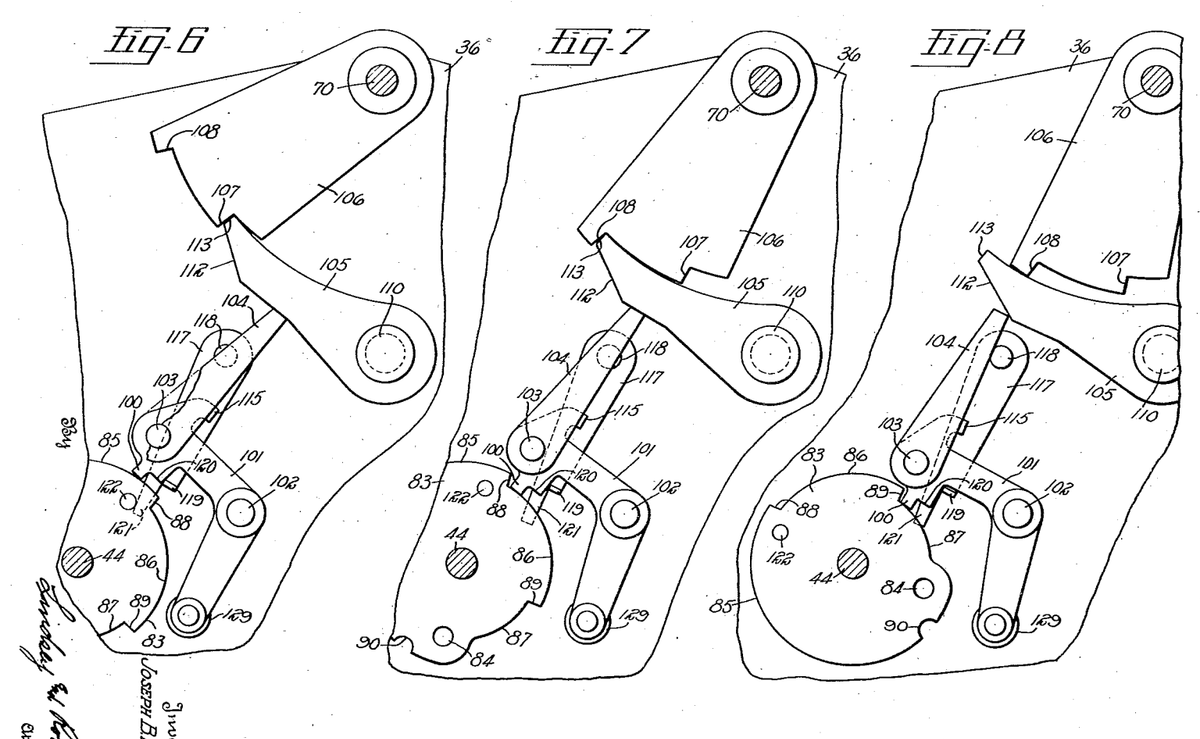
Fig. 6 is a partial view of the predetermining mechanism with the tripping cam shown in the position which it assumes during the presetting operation.
Fig. 7 is a like view showing the position of the parts during the "dribbling" period of the fluid dispensing operation.
Fig. 8 also is a like view showing the position of the parts after the dispensing operation has been completed.

The operation of the predetermining mechanism so far described is briefly as follows. For convenience, it may be assumed that the parts are in the position illustrated in Figs. 3, 4, and 5 and in which position the apparatus is declutched from the computer. When the apparatus is in this condition, the flow of liquid from the pump may be manually controlled by the operator by means of the valve 30 provided in the nozzle 29. The parts are in this position after the apparatus and computer have been reset following a previous dispensing operation. The traveling nut is in its left hand position and the preset counter indicates zero. Assuming now that four dollars' worth of gasoline is to be dispensed, the preset handle 46 is turned until the amount of four dollars appears in the window 47, as shown in Fig. 1. During this time, the traveling nut will move from the left hand position to a position on the screw corresponding to a four dollar value of liquid. Upon initial rotation of the preset handle, the feed screw and the gear 56 are rotated clockwise (with reference to Fig. 4), and the stud 81 (the spring 82 having been loaded during the preceding dispensing operation) will follow the driving lug 91 so that the cam will turn from the position shown in Fig. 4 to that shown in Fig. 6 and in which latter position it will be held by the detent 92. As the cam approaches the position shown in Fig. 6, the knock-off pin 122 carried thereby disengages the latch from the follower whereupon the follower drops down and engages the cam surface 85 as shown in Fig. 6. When the cam reaches the position shown in Fig. 6, the stud 81 is withdrawn from the driving lug 91 because the nut is moving away from the gear 56 to its preselected position. On further rotation of the preset handle, the stud 81 is withdrawn from the opening 84 of the cam 83 but the stud will be held in alignment with that opening by the now partially unwound spring 82 which holds the lug 80' against the lower edge of the arm 76. The nut having been preset in accordance with the value of the liquid to be dispensed (in the present instance four dollars' worth) the selector handle 135 is moved to the value indicating position shown in Fig. 1 so that the cost drive clutch, including the sleeve 51, is engaged. The valve handle 72 is then moved from the closed position shown in Fig. 1 to its open position, thus opening the valve D, and when this is done the stop lever 106 is moved from the full line position to the broken line position shown in Fig. 4 and in which latter position it is held by the pawl 105 which, in turn, is held in holding position by the arm 104. The dispensing operation is now proceeded with, and during such operation the cost indicating portion of the computer is driven through the variator and the feed screw 44 is rotated in timed relation to the cost indicating portion of the computer and in a direction to cause the traveling nut to travel from its preselected position towards its zero position shown in Fig. 6. Just before the dispensing operation is completed, the stud 81 will be moved by the traveling nut through the opening 84 in the cam and into the path of movement of the driving lug 91 of the gear 56. Immediately after the driving lug 91 picks up the pin 80 and causes the cam 83 to rotate counter-clockwise, the follower 100 rides off of the cam surface 85 onto the cam surface 86 as shown in Figure 7, with the result that the arm 104 and the pawl 105 drop down to an extent sufficient to permit the end of the pawl 105 to escape from the forward stop shoulder 107 of the stop plate and lie in the path of movement of the rear stop shoulder 108. This permits the stop plate to move from the position shown in Figure 6 to that shown in Figure 7 and in which position the control valve D of the pump is almost, but not quite, closed, thus reducing the flow of liquid to a dribble. The liquid will continue to dribble out of the nozzle until the cam has been further rotated counterclockwise to a position where the follower rides off of the cam surface 86 onto the cam surface 87. When this occurs the arm 104 and the pawl 105 assume the positions shown in Figure 8, and from which figure it will be seen that the pawl 105 has been released from the shoulder 108, thus permitting the valve D to fully close and shut off the flow of fluid. It will be observed that when the follower rides from the surface 86 onto the surface 87 the supporting lever 101 turns counter-clockwise to such an extent that the ear 115 moves the arm 104 to a position where the free end of that arm engages the inclined cam surface 112 of the holding pawl 105.

Figure 4:
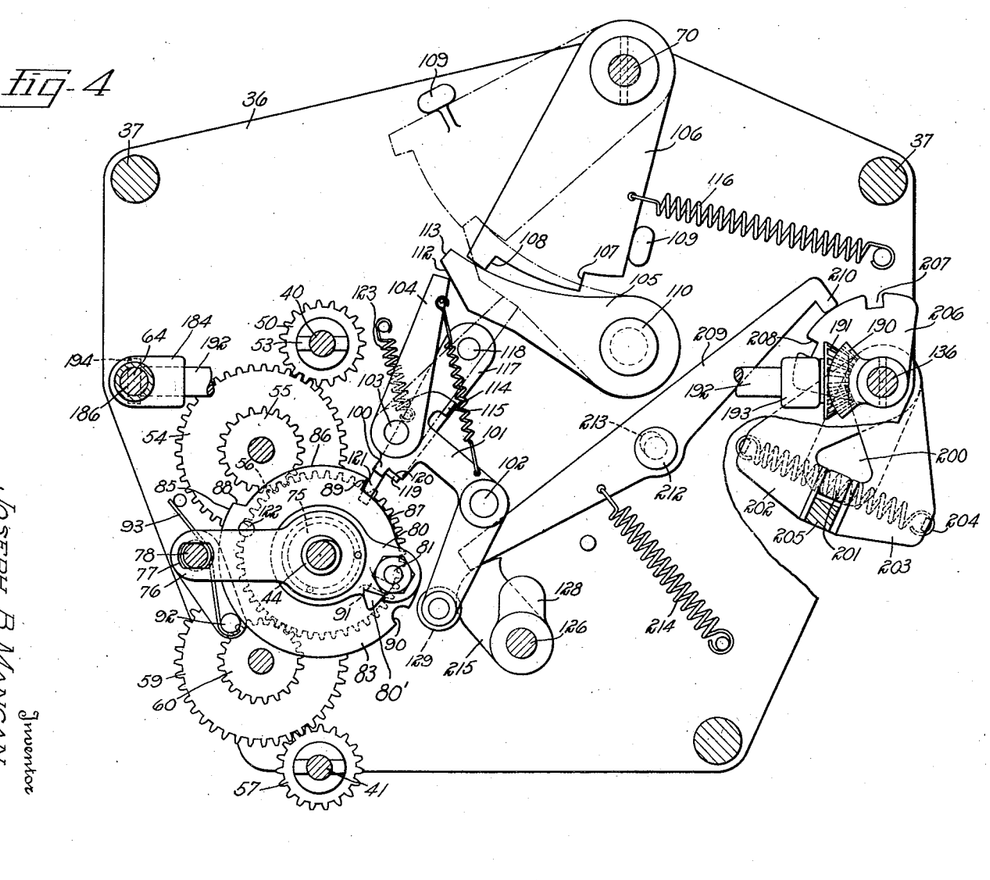
Fig. 4 is a view similar to Fig. 3 taken on line 4—4 of Fig. 2.

The dispensing operation has now been completed so that the computer and the predetermining apparatus is no longer driven; the traveling nut is in its zero position and the cam 83 is in the position shown in Figure 4 and from which position it is rotated clockwise upon the next presetting operation, and the releasing mechanism is in the uncocked or unlatched position shown in Figure 8. In order to permit the cam to be rotated clockwise during the next presetting operation, it is necessary to raise the follower 100 to the latched position shown in Figure 4. This is effected during the operation of resetting the computer and predetermining mechanism and which operation, as previously stated, is effected by rotating the resetting handle 125. As hereinafter described more in detail, the predetermining apparatus is declutched from the computer and other parts of the mechanism are restored to normal position. Then, the cam lug 128 on the reset shaft 126 engages the roller 129 of the bell crank 101 with the result that bell crank is swung from the position shown in Figure 8 to that shown in Figure 4 so that the latch 117 may move to the latching position illustrated in Figure 4.

Figure 10:
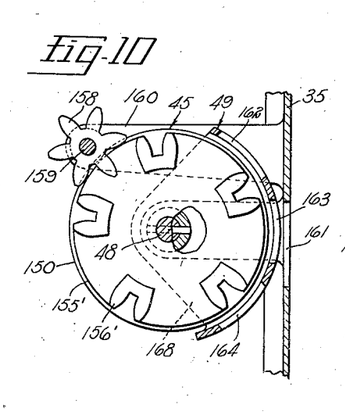
Fig. 10 is a detail view of the first counter wheel and associated parts.
Figure 11:
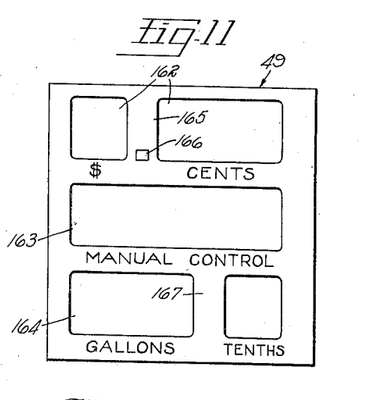
Fig. 11 is a front elevation of the sign shutter developed into a plane.

Referring now more in detail to the preset counter 45, the same comprises, as shown in Figs. 2 and 3, three counter wheels 150, 151, and 152 carried by the counter shaft 48. This counter shaft is supported by lugs 153 projecting from the rear face of the front frame member 35. The wheel 150 of lowest order is fixed to the counter shaft 46 and has ten numerals about its periphery, these numerals alternately being a "0" and a "5" so as to indicate units of five-cent value when the counter is used to indicate the value of the liquid to be dispensed, and to indicate units of half gallons when the counter is set to indicate the amount of liquid to be dispensed. The other two wheels are provided with numerals consecutively running from "0" to "9." The wheel 151 indicates tens of cents or units of gallons, as the case may be, and the wheel 152 of highest order indicates dollars or tens of gallons, as the case may be. The transfer mechanism, whereby the third wheel is moved one step ($\frac{1}{10}$ of a revolution) each time the second wheel makes a complete revolution, may be of any suitable sort, that shown in the drawings being of an old and well-known type. It comprises a locking disk 155 (see Fig. 2) carried by the wheel 151 and having a two-toothed gear segment 156; a twenty-toothed gear 157 on the opposing face of the wheel 152, and a transfer pinion 158 journaled on a shaft 159 supported by brackets 160. The transfer pinion has aligned teeth long enough to cooperate with the locking disk and the twenty-toothed gear, and intervening short teeth meshing with the twenty-toothed gear and adapted to cooperate with the two-toothed gear segment. The transfer mechanism between the first wheel and second wheel is similar to that described but in this instance, as most clearly shown in Fig. 10, the locking disk 155' has five equally spaced apart two-toothed gear segments 156' so that upon each one-fifth of a revolution of the wheel 150 the wheel 151 will be advanced one step, i. e., one-tenth of a revolution. The counter wheels are located behind a sight opening 161 which registers with the window 47 in the side wall 20 of the pump casing. The preset counter is provided with the adjustable shutter 49 so that the counter can be used to selectively indicate value of the predetermined amount of liquid to be dispensed; the amount or volume of the liquid to be dispensed; or that the predetermining apparatus is disconnected from the computer and the flow of fluid is entirely within the manual control of the operator. This shutter, as most clearly shown in Figs. 3 and 10, comprises a parti-cylindrical plate interposed between the counter wheels and the window 161 and itself having three sight openings 162, 163, and 164. The upper sight opening 162 is divided by a partition 165 located between the numerals of the second and third wheels, and this partition may carry a decimal mark 166 (see Fig. 11) so as to show that the numerals of the wheel of highest order indicate dollars and the numerals of the other wheels indicate cents. Also, if desired, the shutter may bear, below this sight opening, a dollar sign and the word "cents." The central sight opening 163 is continuous throughout its length, and when the shutter is in a position where this sight opening registers with the window 47, the predetermining apparatus is disengaged from the computer. Below this sight opening may bear the indicia "manual control." The lowermost sight opening 164 is divided by a partition 167 located between the numerals of the first and second wheels so as to show that the numerals on the wheel of lowest order designate tenths of gallons. The shutter, below this sight opening, may bear the indicia "gallons" and "$\frac{1}{10}$ gal." The shutter has an end wall 168 provided with an apertured boss 169 journaled on the countershaft 48.

The shutter is selectively set to its three positions of adjustment by the previously described selector handle or crank 135. Fixed to the selector shaft 136 is a bevel gear segment 175 meshing with a like segment 176 carried by a sleeve 177 journaled on the countershaft 48 and keyed, as at 178, to the boss 169 of the shutter. When the handle 135 is in the "value" indicating position shown in Fig. 1, the top sight opening of the shutter registers with the window 47 and, as previously described, at this time the predetermining apparatus is clutched to the cost indicating portion of the computer. When the handle 135 is in its mid or "manual control" position, the shutter is in the position shown in Fig. 3 and the predetermining apparatus is completely declutched from the computer. When the handle is in "gallon" indicating position, the bottom sight opening of the shutter registers with the window 47 and, as previously stated, the predetermining apparatus is clutched to the amount indicating portion of the computer.

As previously stated, the predetermining mechanism and the preset counter are simultaneously preset in accordance with the amount or value of the liquid to be dispensed, as the case may be, by rotating the preset handle 46, this being done when the apparatus is completely de-clutched from the computer. The handle is rotated clockwise, as shown by the arrow in Fig. 1, during the presetting operation, and during such time the counter wheels are turned in an additive direction and the feed screw 44 is turned in a direction to advance the screw from its zero position to a pre-selected position. One complete revolution of the handle 46 will cause the counter wheel of lowest order to make one revolution which is equivalent to a fifty-cent value or five gallons of gasoline. Means, which comprises the cone clutch 74, is provided for insuring that the preset handle 46 is disconnected from the counter and predetermining mechanism while the apparatus is clutched or in driven relation to the computer. The gear 63 forms one part of the clutch, the same having an internal clutch face 180. A cooperating clutch member 181 is fixed to the preset shaft 64 by a pin 182. In order to permit of disengagement of the clutch, the preset shaft 64 has a limited axial movement in a bearing 183 provided in the frame member 35 and in a bearing provided in a bracket 184 projecting from the rear frame member. The clutch member 74 is normally urged into clutch position by a spring 187. To prevent axial movement of the gear 63 when the shaft 64 is moved axially, the hub of the gear is interposed between sleeves 185 and 186, the extreme ends of which respectively engage the frame member 35 and the bracket 184. The sleeve 185 is provided with a slot 188 so as to accommodate movement of the clutch member 181 and the pin 182. Engagement and disengagement of the cone clutch is controlled by the aforementioned selector handle 135 in the manner now to be described. Fixed to the selector shaft 136 is a bevel gear segment 190 meshing with a complementary segment 191 fixed to a rock shaft 192 journaled in a bracket 193 and the bracket 194. As shown in Figs. 2 and 5, on the left hand end of this rock shaft 192 is a cam 194 disposed immediately behind the rear end of the preset shaft 64. This cam has two lobes 194' and 194" with a flat face therebetween. When the selector handle is in its mid or manual control position (in which case the predetermining apparatus is declutched from the computer and the flow of fluid is under manual control), the flat face of the cam 194 is opposed to the end of the shaft 64 so that the spring 187 may maintain the cone clutch engaged. The predetermining apparatus may now be preset in accordance with the requirements of the customer during the next dispensing operation. If the selector handle 135 is now moved to its value indicating position, as shown in Fig. 1 (in which position the predetermining apparatus is clutched to the cost indicating portion of the computer), the lower lobe 194" of the cam 194 moves the preset shaft 64 to the right with reference to Fig. 5 so as to disengage the cone clutch. When the selector handle 135 is moved to its gallons indicating position (in which position the predetermining apparatus is under the control of the quantity indicating portion of the computer), the upper lobe 194' disengages the cone clutch.

As previously stated, after a dispensing operation has been completed, the computer is reset by turning the reset handle 125 one complete revolution, and during such resetting operation, the cam lobe 128 restores the releasing means of the predetermining mechanism to the latched position shown in Fig. 4. Now upon initial rotation of this reset handle and before the cam lobe 128 becomes effective to restore said releasing means, the selector shaft 136 is automatically restored to its "manual control" position and through this selector shaft the clutches associated with the drive shafts 40 and 41 are moved to neutral position, the cone clutch 74 is engaged, and the shutter of the counter is moved to manual control indicating position. The arrangements through which these movements are brought about will now be described.

Associated with the preselector shaft is a self-centering lever device which normally urges the selector shaft 136 and preset handle carried thereby to the mid or "manual control" position shown in Figs. 3 and 4. This device, as shown most clearly in Figs. 4 and 12 comprises a plate 200 fixed to the rear end of the selector shaft 136 and having a lug 201 positioned between the free ends of two arms 202 and 203 pivotally carried by the shaft 136. These arms are pressed towards each other and towards the lug 201 by a spring 204. Projecting from the rear face of the rear frame member 36 is a fixed abutment member 205 also positioned between the free ends of the arms 202 and 203.

Fixed to the selector shaft is a locking plate 206 in the form of a sector having on its periphery two notches 207 and 208 respectively corresponding to the gallon and value positions of the selector handle. The numeral 209 designates a locking lever having at one end a tooth 210 adapted to engage in the notch 208 when the selector is in gallons indicating position; in the notch 207 when the selector handle is in value indicating position, and against the peripheral portion of the plate 206 between the notches 207 and 208 when the selector handle is in manual control or mid position. This lever, as will shortly be described, is operated by the resetting mechanism. It will be seen that when the locking tooth 210 is engaged in the notch 208, the plate 200 maintains the arm 202 away from the abutment stop 205, and the arm 203 is engaged against that stop. When the tooth 210 is moved out of the notch 208, the arm 202, under the influence of the spring 204, returns the plate to the position shown in Fig. 4 in which position the selector shaft is in mid or manual control position.

Figure 12:
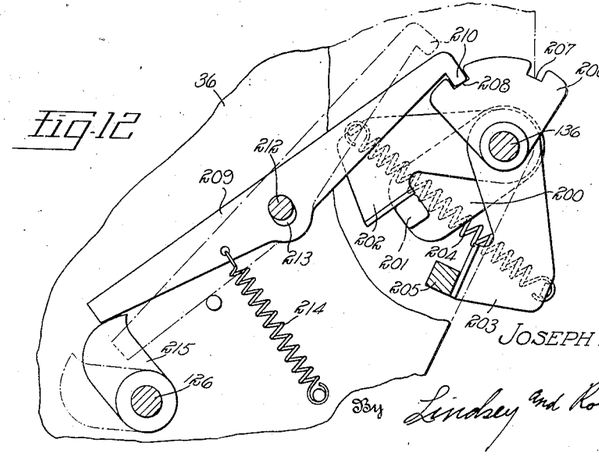
Fig. 12 is a fragmentary view of the locking means and self centering device associated with the selector shaft.

The locking lever 209 is pivoted on a pin 212 and the opening 213 which receives this pin is somewhat elongated transversely to the direction of the length of the lever. The lever is normally urged by a spring 214 in a direction to disengage the locking tooth 210 from the locking plate. Carried by the reset shaft 126 is a cam 215 which in normal position engages beneath the lower end of the locking lever so that the operative end of the locking lever engages the locking plate. In Fig. 4, the parts are in the position which they have when the selector handle is in manual control position. When that handle is turned to value indicating position, as shown in Figs. 1 and 12, the notch 208 is brought beneath the tooth 210 with the result that the spring 214 will pull the lever down about the cam 215 as a fulcrum so that the tooth 210 will engage in the notch and thus hold the selector shaft in its adjusted position. In this position of the shaft, the clutch associated with the cost drive shaft 40 is engaged, the sign shutter of the preset counter is in a position to indicate value, and the lobe 194" of the throw-out cam 194 maintains the cone clutch 74 disengaged. The dispensing operation may now be carried out and after it has been completed, the predetermining apparatus and the computer are reset. On initial rotation of the reset handle, the cam 215 is withdrawn from beneath the lower end of the locking lever 209, whereupon the spring will turn this lever in a direction to disengage the tooth 210 from the notch 208 with the result that the self-centering device will return the preselector shaft to its manual control position shown in Fig. 4.

I claim as my invention:

1. A mechanism for ultimately limiting to a predetermined volume or value the liquid dispensed through a valve, said mechanism including a counter for indicating the volume and value of the liquid dispensed, two drive shafts respectively connected to the volume and value indicating portions of the counter, a control member for said valve, a feed screw, a traveling nut differentially adjustable lengthwise thereof in accordance with the predetermined amount or value of the liquid to be dispensed, tripping means controlled by said nut and associated with said control member, a driving connection including a clutch between each of said shafts and said feed screw, means for selectively engaging said clutches, and a preset counter geared to said feed screw for selectively indicating the volume or value of the liquid to be dispensed.

2. A mechanism for ultimately limiting to a predetermined volume or value the liquid dispensed through a valve, said mechanism including a counter for indicating the volume and value of the liquid dispensed, two drive shafts respectively connected to the volume and value indicating portions of the counter, a control member for said valve, a predetermined mechanism arranged to trip said control member when a predetermined volume or value of liquid has been dispensed, a driving connection including a clutch between each of said shafts and said predetermining mechanism, manually operable means for selectively connecting said clutches and for ultimately disengaging both of them, a preset counter geared to said predetermining mechanism, means for presetting said predetermining mechanism and preset counter in accordance with the volume or value of the liquid to be dispensed, and reset means for resetting said predetermining mechanism and conditioning said manually operable means to a position where both of said clutches are disengaged.

3. A mechanism for ultimately limiting to a predetermined volume or value the liquid dispensed through a valve, said mechanism including a counter for indicating the volume and value of the liquid dispensed, two drive shafts respectively connected to the volume and cost indicating portions of the counter, a control member for said valve, a predetermining mechanism arranged to trip said control member when a predetermined volume or value of liquid has been dispensed, a driving connection including a clutch between each of said members and said mechanism, clutch operating means for selectively engaging said clutches, a preset counter geared to said predetermining mechanism for indicating the setting thereof, and an adjustable sign shutter associated with said counter for denoting the character of the indications thereof.

4. A mechanism for selectively limiting to either a predetermined volume or value the liquid dispensed through a valve, said mechanism including a counter for indicating the volume and value of the liquid dispensed, two drive shafts respectively connected to the volume and value indicating portions of the counter, a control member for said valve, a predetermining mechanism arranged to trip said control member when a predetermined volume or value of liquid has been dispensed, a driving connection including a clutch between each of said members and said mechanism, clutch operating means for selectively engaging said clutches, a preset counter geared to said predetermining mechanism for indicating the setting thereof, an adjustable sign shutter associated with said counter for denoting the character of the indications thereof, and a selector shaft for simultaneously controlling said clutch operating means and setting said adjustable sign shutter.

5. A mechanism for selectively limiting to either a predetermined volume or value the liquid dispensed through a valve, said mechanism including a counter for indicating the volume and value of the liquid dispensed, two drive shafts respectively connected to the volume and value indicating portions of the counter, a control member for said valve, a predetermining mechanism arranged to trip said control member when a predetermined volume or value of liquid has been dispensed, a driving connection including a clutch between each of said shafts and said predetermining mechanism, means for selectively connecting said clutches, a preset counter geared to said predetermining mechanism, an adjustable sign shutter associated with said counter for denoting the character of the indications thereof, means including a shaft for presetting said predetermining mechanism and counter in accordance with the volume or value of the liquid to be dispensed, and a manually settable selector member for controlling said clutches and said shutter and for disconnecting said preset shaft when either of said clutches are engaged.

6. A predetermined mechanism including two drive shafts, a valve control member, predetermining mechanism arranged to trip said control member when a predetermined volume or value of liquid has been dispensed through the valve control, a driving connection including a clutch between each of said shafts and said predetermining mechanism, means for selectively connecting said clutches, a preset counter geared to said predetermining mechanism, an adjustable sign shutter associated with said counter for denoting the character of the indications thereof, a handle for presetting said predetermining mechanism and counter, means for disengaging said handle, a manually settable selector shaft, and operative connections between said selector shaft and said clutch connecting means, said adjustable shutter, and said disengaging means.

7. A predetermining mechanism including two drive shafts, a control member, predetermining means arranged to trip said control member, a driving connection including a clutch between each of said shafts and said predetermining means including a selector shaft for selectively connecting said clutches and disengaging both of them, said selector shaft having three positions, in two of which the clutches are respectively connected and in the other of which both of said clutches are disconnected, means for locking said selector shaft in its clutch engaging positions, means for returning said selector shaft to clutch disengaging position when said shaft is unlocked, a preset counter geared to said predetermining means, an adjustable sign shutter for said counter having three positions corresponding to the three positions of said selector shaft, an operative connection between said sign shutter and selector shaft through which said shaft adjusts said shutter, and reset means for resetting said predetermining means and unlocking said selector shaft.

8. In a predetermining apparatus two drive shafts, a control member, a predetermining mechanism arranged to trip said control member a driving connection including a clutch between each of said shafts and said predetermining mechanism, means including a selector shaft for selectively connecting said clutches and disengaging both of them, said selector shaft having three positions, in two of which the clutches are respectively connected and in the other of which both of said clutches are disconnected, means for locking said selector shaft in its clutch engaging positions, means for returning said selector shaft to clutch disengaging position when said shaft is unlocked, a preset counter geared to said predetermining mechanism, an adjustable sign shutter for said counter and having three positions corresponding to the three positions of said selector shaft, an operative connection between said sign shutter and selector shaft through which said shaft adjusts said shutter, means including a handle for presetting said predetermining mechanism and preset counter, a disengageable clutch associated with said handle, an operative connection between said selector shaft and last-mentioned clutch for disengaging the latter when said selector shaft is in either of its locked positions, and reset means for resetting said predetermining mechanism and unlocking said selector shaft.

9. In a predetermining apparatus a control member having an open position, a partially closed position and a fully closed position; a tripping cam having three successive surfaces of different radii, releasing means between said cam and control member and including a trigger adapted to engage said surfaces, means for latching said trigger out of engagement with said cam, a driven differentially adjustable member, manual means for presetting said member, means associated with said member for rotating said cam in one direction during the presetting operation to a preset position where the surface of greatest radius is opposed to said trigger and for rotating said cam in a reverse direction towards the end of the dispensing operation, and means carried by said cam for releasing said latch when said cam is brought to preset position.

10. In a predetermining apparatus a control member having an open position, a partially closed position, and a full closed position; a tripping cam having successive surfaces of different radii, releasing means between said cam and control member and including a trigger adapted to engage said surfaces, means for latching said trigger out of engagement with said cam, a driven differentially adjustable member, manual means for presetting said member, means associated with said member for moving said cam during the presetting operation to a preset position where the surface of greatest radius is opposed to said trigger and for rotating said cam in a reverse direction towards the end of the dispensing operation, means carried by said cam for releasing said latch when said cam is brought to preset position, and reset means for moving said trigger to latched position.

11. In a predetermining apparatus a control member having an open position, a partially closed position, and a full closed position; a pawl for holding said member in the last two mentioned positions, a tripping cam having three successive surfaces of different radii, a pivoted trigger adapted to engage said surfaces, an arm pivotally carried by said trigger and adapted to hold said pawl in engaging position, means for latching said trigger out of engagement with said cam, a differentially adjustable driven member, manual means for presetting said adjustable member, means associated with said adjustable member for rotating said cam in one direction during the presetting operation to a preset position where the surface of greatest radius is opposed to said trigger and for rotating said cam in a reverse direction towards the end of a dispensing operation, and means carried by said cam for releasing said latch when said cam is brought to preset position.

12. In a predetermining apparatus for use in connection with a liquid dispensing valve, a valve control member having a pair of shoulders, a pivoted pawl adapted to engage said shoulders, a feed screw adapted to be driven in accordance with a valve dispensing operation, a traveling nut on said feed screw, manual means for presetting said nut in accordance with the amount of liquid to be dispensed, a tripping cam, releasing means between said tripping cam and said pawl, and means associated with said nut and screw for rotating said cam.

13. In a predetermining apparatus for use in connection with a liquid dispensing valve; a valve control member having an open position, a partially closed position and a full closed position corresponding to respective fittings of the valve; a tripping cam having successive surfaces of different radii, releasing means between said cam and control member and including a trigger adapted to engage said surfaces, means for latching said trigger out of engagement with said cam, a feed screw adapted to be driven in accordance with a valve dispensing operation, a traveling nut carried by said screw, means for rotating said screw to preset said nut thereon, means associated with said nut for turning said cam in one direction to a preset position where the surface of greatest radius is opposed to said trigger, means associated with said screw for moving said cam in a reverse direction towards the end of the dispensing operation, means for releasing said latch when said cam is brought to preset position, and reset means for moving said trigger to latched position.

JOSEPH B. MANGAN.